(12) United States Patent
Takeuchi

(10) Patent No.: US 12,381,781 B2
(45) Date of Patent: Aug. 5, 2025

(54) PARAMETER VALUE SETTING SYSTEM FOR SETTING REFERENCE SOURCE PARAMETER VALUES, CONTROL METHOD OF PARAMETER VALUE SETTING SYSTEM AND PROGRAM

(71) Applicant: RAKUTEN MOBILE, INC., Tokyo (JP)

(72) Inventor: Kazushige Takeuchi, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/044,787

(22) PCT Filed: Sep. 1, 2021

(86) PCT No.: PCT/JP2021/032202
§ 371 (c)(1),
(2) Date: Mar. 10, 2023

(87) PCT Pub. No.: WO2023/032107
PCT Pub. Date: Mar. 9, 2023

(65) Prior Publication Data
US 2023/0370331 A1    Nov. 16, 2023

(51) Int. Cl.
*H04L 41/0823* (2022.01)
(52) U.S. Cl.
CPC ............... *H04L 41/0823* (2013.01)
(58) Field of Classification Search
CPC .................................................. H04L 41/0823
See application file for complete search history.

(56) References Cited

U.S. PATENT DOCUMENTS

| | | | | |
|---|---|---|---|---|
| 5,666,526 | A * | 9/1997 | Reiter | G06F 16/235 |
| 6,499,041 | B1 * | 12/2002 | Breslau | G06F 40/174 |
| | | | | 715/210 |
| 6,694,362 | B1 * | 2/2004 | Secor | H04L 41/0893 |
| | | | | 705/28 |
| 2013/0290952 | A1 * | 10/2013 | Childers, Jr. | G06F 9/5077 |
| | | | | 718/1 |
| 2015/0281444 | A1 * | 10/2015 | Busch | H04M 3/5133 |
| | | | | 379/265.09 |
| 2015/0326535 | A1 * | 11/2015 | Rao | H04L 41/5054 |
| | | | | 726/15 |
| 2017/0141970 | A1 * | 5/2017 | Adkins, III | H04L 41/5041 |
| 2019/0332661 | A1 * | 10/2019 | Halprin Limor | G06Q 40/08 |
| 2020/0013107 | A1 | 1/2020 | Kusano | |

FOREIGN PATENT DOCUMENTS

WO        2018181826 A1    10/2018

* cited by examiner

*Primary Examiner* — Viet D Vu
(74) *Attorney, Agent, or Firm* — HAUPTMAN HAM, LLP

(57) ABSTRACT

A parameter name data storage module stores a plurality of pieces of parameter name data. A reference data storage module stores reference data indicating a reference destination parameter and a reference source parameter. A presentation module presents, to a user, for one of the plurality of elements that is related to the reference destination parameter, an input screen for inputting a value of a parameter to be set to the related element. A parameter value setting module sets a value input as a value of the reference destination parameter by the user to the input screen, as the value of the reference destination parameter and also as a value of the reference source parameter.

7 Claims, 24 Drawing Sheets

FIG.5

| ID | 030 |
|---|---|
| NAME DATA | BigData Multi Datacenter |

| PARAMETER NAME DATA | TYPE DATA |
|---|---|
| service_url | string |

FIG.6

```
metadata service_url:str
cluster_instance_url:str
```

FIG.7

```
metadata src_cluster_instance_url:str
dest_cluster_instance_url:str
```

FIG.8

```
metadata service_url:str
```

FIG.9

| ID | v01 |
|---|---|
| NAME DATA | BigData Multi Datacenter as a Service |

| BUNDLE ID | QUANTITY DATA |
|---|---|
| 010 | 2 |
| 020 | 2 |
| 030 | 1 |

FIG.10

| REFERENCE SOURCE ID | REFERENCE SOURCE PARAMETER NAME DATA | REFERENCE DESTINATION ID | REFERENCE DESTINATION PARAMETER NAME DATA |
|---|---|---|---|
| 010 | service_url | 030 | service_url |
| 020 | src_cluster_instance_url | 010 | cluster_instance_url |
| 020 | dest_cluster_instance_url | 010 | cluster_instance_url |

PARAMETER VALUE SETTING SYSTEM FOR SETTING REFERENCE SOURCE PARAMETER VALUES, CONTROL METHOD OF PARAMETER VALUE SETTING SYSTEM AND PROGRAM

RELATED APPLICATIONS

The present application is a National Phase of International Application Number PCT/JP2021/032202, filed Sep. 1, 2021.

TECHNICAL FIELD

The present invention relates to a parameter value setting system, a control method of a parameter value setting system, and a program.

BACKGROUND ART

As an example of a technology relating to construction of a functional unit group in accordance with purchase of a network service (NS) by a user, in Patent Literature 1, there is described a technology for deconstructing an order of a product purchased by a customer into virtualized network function (VNF) units and deploying the VNF units on a network functions virtualization infrastructure (NFVI).

CITATION LIST

Patent Literature

[Patent Literature 1] WO 2018/181826 A1

SUMMARY OF INVENTION

Technical Problem

When a user tries to purchase, in a single order, a plurality of NSes which have functions related to one another and which are provided by different vendors, the same value may be required to be set to each of the plurality of NSes as a value of a parameter such as a URL.

However, each vendor independently provides a setting file of the parameter, and the user is therefore required to repeatedly input the same value in order to set each of the plurality of NSes to be purchased. Inputting of the parameter value is consequently laborious.

This is not limited to the case in which a plurality of NSes are provided by separate vendors, but applies also to a case in which a plurality of NSes provided by the same vendor have parameter setting files independent of one another.

The present invention has been made in view of the above-mentioned circumstances, and has an object to provide a parameter value setting system, a control method of a parameter value setting system, and a program which enable a user's trouble in inputting a value of a parameter related to a plurality of network services to be saved.

Solution to Problem

In order to solve the above-mentioned problem, according to one embodiment of the present invention, there is provided a parameter value setting system including: parameter name data storage means for storing, for each of a plurality of elements included in a communication system, a plurality of pieces of parameter name data indicating names of parameters to be set to the each of the plurality of elements, in association with the each of the plurality of elements; reference data storage means for storing reference data indicating a reference destination parameter which is referred to in reference between elements out of the plurality of elements, and a reference source parameter which makes the reference; presentation means for presenting, to a user, for one of the plurality of elements that is related to the reference destination parameter, an input screen for inputting a value of a parameter to be set to the one of the plurality of elements; and parameter value setting means for setting a value input as a value of the reference destination parameter by the user to the input screen, as the value of the reference destination parameter and also as a value of the reference source parameter.

In one embodiment of the present invention, the parameter value setting system further includes input screen generation means for generating the input screen based on the plurality of pieces of parameter name data and the reference data.

Further, in one embodiment of the present invention, the one of the plurality of elements that is related to the reference destination parameter and one of the plurality of elements that is related to the reference source parameter are provided by different vendors.

Further, in one embodiment of the present invention, the parameter value setting system further includes construction means for constructing the one of the plurality of elements that is related to the reference destination parameter and the one of the plurality of elements that is related to the reference source parameter.

Further, in one embodiment of the present invention, the parameter value setting means is configured to further set a value of a remaining parameter to be set to the one of the plurality of elements that is related to the reference source parameter, based on input of the user which is related to the remaining parameter.

Further, in one embodiment of the present invention, the parameter value setting means is configured to set, for a reference source parameter having a plurality of reference destination parameters, as a value of the reference source parameter, a value selected by the user from values set to the plurality of reference destination parameters.

Further, according to one embodiment of the present invention, there is provided a control method of a parameter value setting system, the parameter value setting system including: parameter name data storage means for storing, for each of a plurality of elements included in a communication system, a plurality of pieces of parameter name data indicating names of parameters to be set to the each of the plurality of elements, in association with the each of the plurality of elements; and reference data storage means for storing reference data indicating a reference destination parameter which is referred to in reference between elements out of the plurality of elements, and a reference source parameter which makes the reference, the control method including the steps of: presenting, to a user, for one of the plurality of elements that is related to the reference destination parameter, an input screen for inputting a value of a parameter to be set to the one of the plurality of elements; and setting a value input as a value of the reference destination parameter by the user to the input screen, as the value of the reference destination parameter and also as a value of the reference source parameter.

Further, according to one embodiment of the present invention, there is provided a program for causing a computer to execute the following steps, the computer including:

parameter name data storage means for storing, for each of a plurality of elements included in a communication system, a plurality of pieces of parameter name data indicating names of parameters to be set to the each of the plurality of elements, in association with the each of the plurality of elements; and reference data storage means for storing reference data indicating a reference destination parameter which is referred to in reference between elements out of the plurality of elements, and a reference source parameter which makes the reference, the program causing the computer to execute the steps of: presenting, to a user, for one of the plurality of elements that is related to the reference destination parameter, an input screen for inputting a value of a parameter to be set to the one of the plurality of elements; and setting a value input as a value of the reference destination parameter by the user to the input screen, as the value of the reference destination parameter and also as a value of the reference source parameter.

BRIEF DESCRIPTION OF DRAWINGS

FIG. 5 is a diagram for schematically illustrating an example of structure of a dummy bundle file.

FIG. 6 is a diagram for illustrating an example of parameter definition data of the bundle file illustrated in FIG. 3, with the parameter definition data expressed in a text format.

FIG. 7 is a diagram for illustrating an example of parameter definition data of the bundle file illustrated in FIG. 4, with the parameter definition data expressed in a text format.

FIG. 8 is a diagram for illustrating an example of parameter definition data of the dummy bundle file illustrated in FIG. 5, with the parameter definition data expressed in a text format.

FIG. 9 is a diagram for schematically illustrating an example of structure of a virtual bundle file.

FIG. 10 is a table for showing an example of reference data.

DESCRIPTION OF EMBODIMENTS

One embodiment of the present invention is now described in detail with reference to the drawings.

Figure 1:
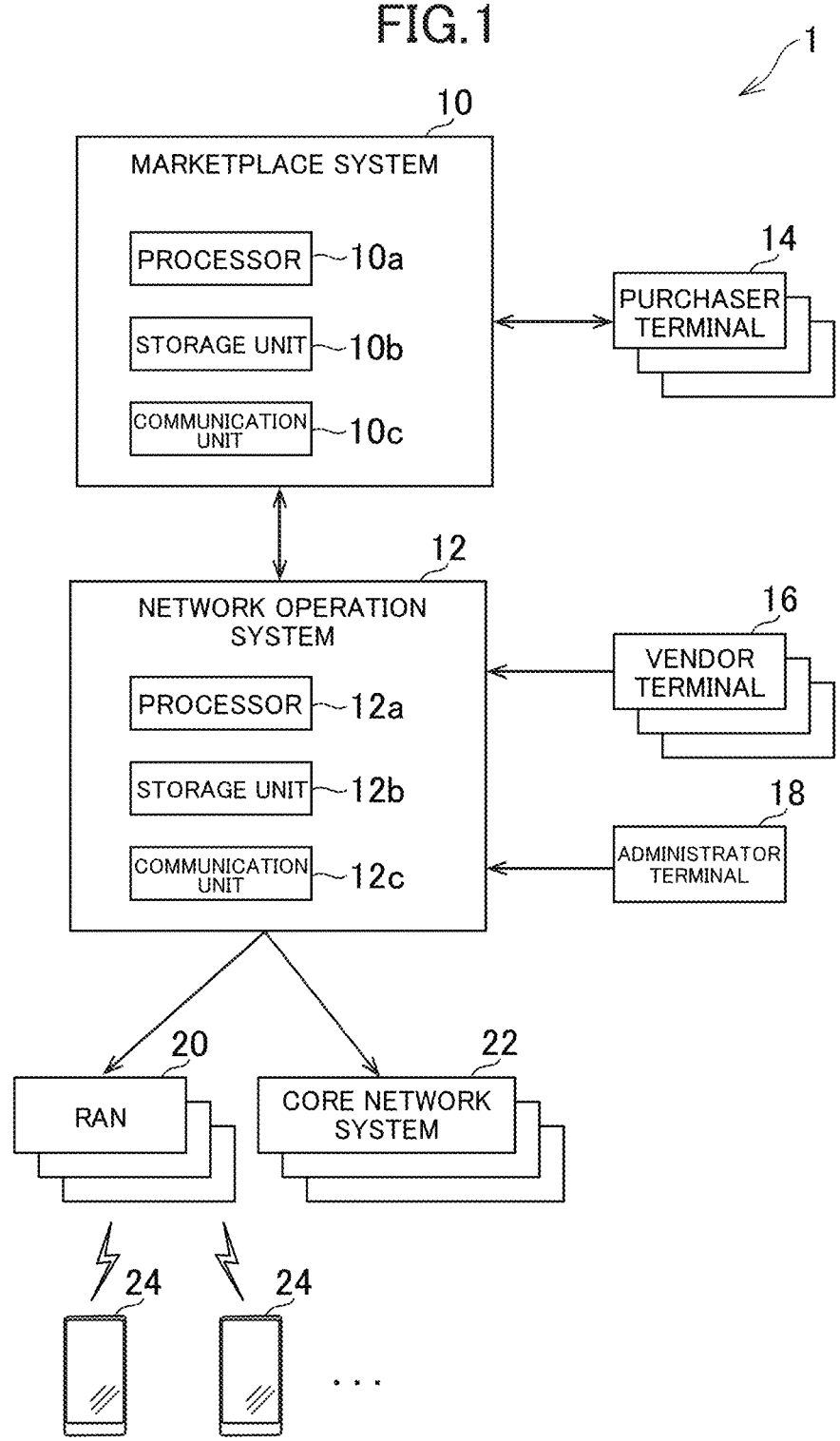
FIG. 1 is a diagram for illustrating an example of a communication system.

FIG. 1 is a diagram for illustrating an example of a communication system 1 in the one embodiment of the present invention. As illustrated in FIG. 1, the communication system 1 in this embodiment includes a marketplace system (MPS) 10, a network operation system (NOS) 12, a plurality of purchaser terminals 14, a plurality of vendor terminals 16, an administrator terminal 18, a plurality of radio access networks (RANs) 20, a plurality of core network systems 22, and a plurality of UEs 24. The RANs 20, the core network systems 22, and the UE 24 implement a mobile communication network in cooperation with one another.

The RANs 20 are each a computer system including an antenna and corresponding to an eNodeB (eNB) in a fourth generation mobile communication system (hereinafter referred to as "4G") and an NR base station (gNB) in a fifth generation mobile communication system (hereinafter referred to as "5G"). The RANs 20 in this embodiment are implemented mainly by servers and communication equipment placed in a data center.

The core network systems 22 are each a system corresponding to an Evolved Packet Core (EPC) in 4G and a 5G core (5GC) in 5G. The core network systems 22 in this embodiment are implemented mainly by the servers placed in the data center.

The MPS 10 in this embodiment is configured on, for example, a cloud platform and, as illustrated in FIG. 1, includes a processor 10a, a storage unit 10b, and a communication unit 10c. The processor 10a is a microprocessor or a similar program control device that operates in accordance with a program installed in the MPS 10. The storage unit 10b is, for example, a ROM, a RAM, or a similar storage element, a solid state drive (SSD), or a hard disk drive (HDD). The storage unit 10b stores, among others, a program executed by the processor 10a. The communication unit 10c is a communication interface, such as a network interface card (NIC) or a wireless LAN module. Software-Defined Networking (SDN) may be implemented in the communication unit 10c. The communication unit 10c exchanges data with the NOS 12 and the purchaser terminals 14. The MPS 10 in this embodiment is implemented by, for example, the servers placed in the data center.

The NOS 12 in this embodiment is configured on, for example, a cloud platform and, as illustrated in FIG. 1, includes a processor 12a, a storage unit 12b, and a communication unit 12c. The processor 12a is a microprocessor or a similar program control device that operates in accordance with a program installed in the NOS 12. The storage unit 12b is, for example, a ROM, a RAM, or a similar storage element, a solid state drive (SSD), or a hard disk drive (HDD). The storage unit 12b stores, among others, a program executed by the processor 12a. The communication unit 12c is a communication interface, such as an NIC or a wireless LAN module. Software-Defined Networking (SDN) may be implemented in the communication unit 12c. The communication unit 12c exchanges data with the MPS 10, the vendor terminals 16, the administrator terminal 18, the RANs 20, and the core network systems 22. In this embodiment, the NOS 12 is implemented by the servers placed in the data center.

In this embodiment, in response to, for example, a request issued by a user of the communication system 1 to purchase a network service (NS), the NS requested to be purchased is constructed on the RANs 20 and the core network systems 22. The constructed NS is provided to the user.

For instance, an audio communication service, a data communication service, a big data collection service, or a similar NS is provided to a purchaser (user) who is a mobile virtual network operator (MVNO).

In this embodiment, a Docker or another container-type application execution environment is installed in the above-mentioned servers placed in the data center, and a container can be deployed and run on those servers.

An NS provided to a user who is a purchaser in this embodiment includes one or a plurality of functional units (for example, network functions (NFs)). In this embodiment, the functional units are implemented by containerized network functions (CNFs), which are container-based functional units.

The NOS 12 in this embodiment is installed with, for example, Kubernetes or a similar container management tool and Helm or a similar package manager. The NOS 12 executes life cycle management of a container, which includes construction of a container which involves deployment and setting of a container, for the servers included in the data center. The container management tool which is Kubernetes or the like and the package manager which is Helm or the like may be provided in the RANs 20 or the core network systems 22.

The purchaser terminals 14 in this embodiment are, for example, general computers, such as smartphones, tablet terminals, and personal computers, which are used by users who are purchasers of NSes or other elements included in the communication system 1.

In this embodiment, users who are purchasers of NSes or other elements included in the communication system 1 can purchase elements included in the communication system 1 via, for example, a screen displayed on the purchaser terminals 14.

The vendor terminals 16 in this embodiment are, for example, general computers, such as smartphones, tablet terminals, and personal computers, which are used by service providers who provide NSes or other elements included in the communication system 1, and other vendors.

The administrator terminal 18 in this embodiment is, for example, a general computer, such as a smartphone, a tablet terminal, and a personal computer, which is used by an administrator of the NOS 12.

An example of NSes and other elements to be purchased by users who are the purchasers in this embodiment is now described.

Figure 2:
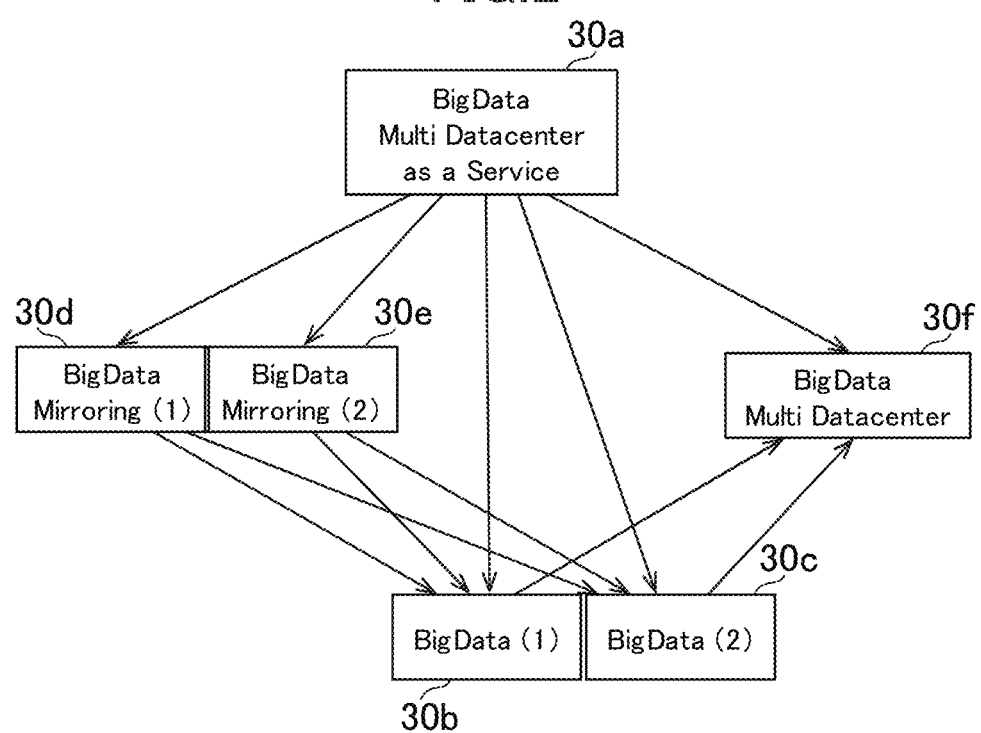
FIG. 2 is a diagram for schematically illustrating an example of a configuration of an element to be purchased by a user.

FIG. 2 is a diagram for schematically illustrating an example of a configuration of an element to be purchased by a user. In this embodiment, a user purchases, for example, an NS 30a illustrated in FIG. 2 which is named "BigData Multi Datacenter as a Service."

The NS 30a in this embodiment is a package product NS including a plurality of NSes. The NS 30a includes, for example, two NSes (an NS 30b and an NS 30c) named "BigData" as illustrated in FIG. 2. The NS 30a also includes two NSes (an NS 30d and an NS 30e) named "BigData Mirroring." The NS 30a further includes one NS (an NS 30f) named "BigData Multi Datacenter."

The NS 30b and the NS 30c are, for example, NSes including pods that are used to collect big data in the communication system 1. The NS 30d and the NS 30e are, for example, NSes including pods that execute data mirroring between the NSes named "BigData."

The NS 30f is a dummy NS for supporting collection of big data in a plurality of data centers. The NS 30f does not include pods or any other substances of an application.

The NS 30a is an NS for managing a package product including a plurality of NSes. The NS 30a also does not include pods or any other substances of an application.

In FIG. 2, the inclusion of the NS 30b, the NS 30c, the NS 30d, the NS 30e, and the NS 30f in the NS 30a, that is, the dependence of the NS 30a on the NS 30b, the NS 30c, the NS 30d, the NS 30e, and the NS 30f, is indicated by arrows.

In this embodiment, reference data described later indicates a reference destination parameter, which is referred to in reference between elements, and a reference source parameter of the reference. In FIG. 2, arrows each drawn from an NS that includes a reference source parameter in the reference data toward an NS that includes a reference destination parameter in the reference data are illustrated.

An example given here has an arrow drawn from the NS 30d toward the NS 30b, an arrow drawn from the NS 30d toward the NS 30c, an arrow drawn from the NS 30e toward the NS 30b, and an arrow drawn from the NS 30e toward the NS 30c. Thus, in this embodiment, the NS 30d depends on the NS 30b and the NS 30c, and the NS 30e depends on the NS 30b and the NS 30c.

The example given here also has an arrow drawn from the NS 30b toward the NS 30f and an arrow drawn from the NS 30c toward the NS 30f. Thus, in this embodiment, the NS 30b depends on the NS 30f, and the NS 30c depends on the NS 30f.

In this embodiment, a Continuous Integration (CI)/Continuous Delivery (CD) pipeline including a development environment, a verification environment, and a test environment is provided to vendors. In this embodiment, the CI/CD pipeline is utilized in an onboarding process through which a vendor creates a verified bundle file corresponding to an NS or other elements to be provided to purchasers, and the bundle file is on-boarded. The bundle file is registered in the NOS 12.

Figure 3:
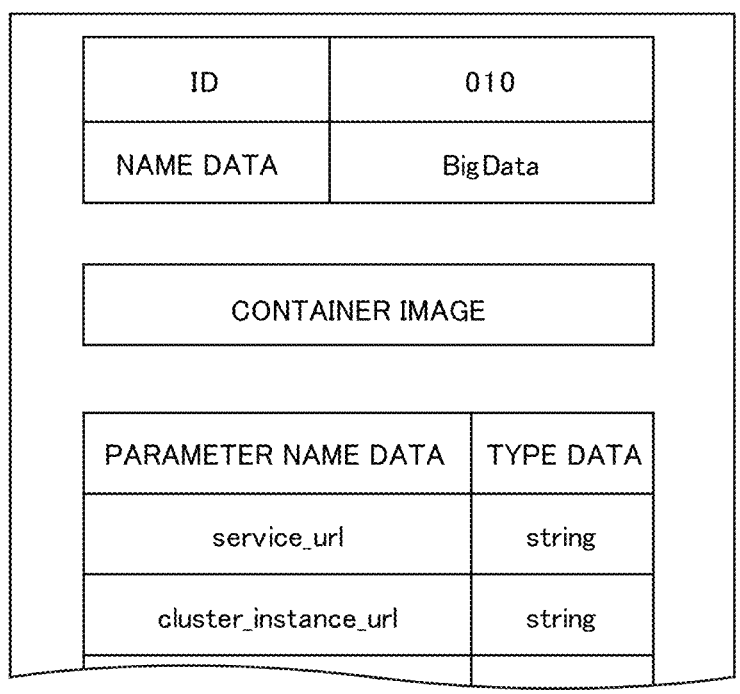
FIG. 3 is a diagram for schematically illustrating an example of structure of a bundle file.
Figure 4:
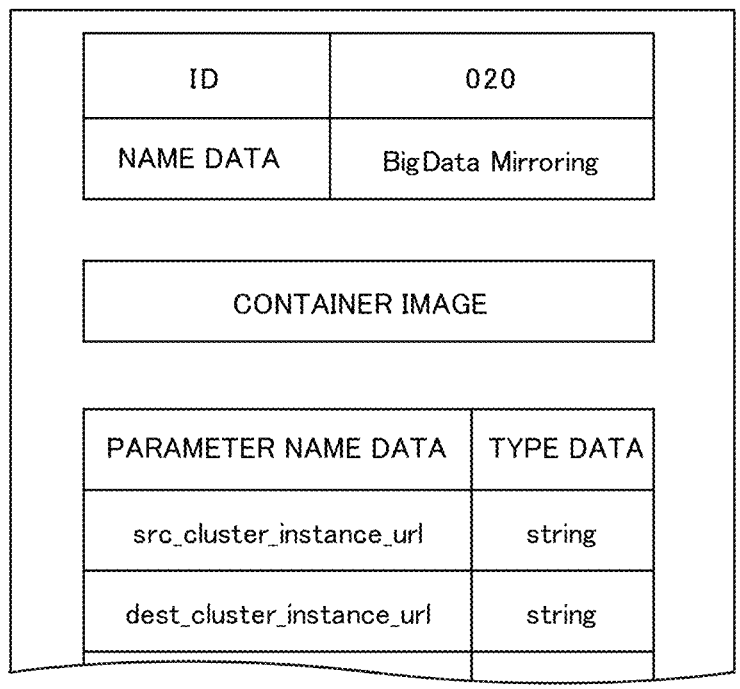
FIG. 4 is a diagram for schematically illustrating an example of structure of another bundle file.

FIG. 3 is a diagram for schematically illustrating an example of structure of a bundle file that corresponds to the NS 30b and the NS 30c described above. FIG. 4 is a diagram for schematically illustrating an example of structure of a bundle file that corresponds to the NS 30d and the NS 30e described above.

As illustrated in FIG. 3 and FIG. 4, each bundle file includes an ID which is an identifier of the bundle file and name data indicating a name of the bundle file.

Each bundle file also includes a program file in which NSes or other elements corresponding to the bundle file are implemented. For example, each bundle file includes a container image of pods as illustrated in FIG. 3 and FIG. 4.

Each bundle file further includes parameter definition data indicating a definition of one or a plurality of parameters used to construct the elements. As illustrated in FIG. 3 and FIG. 4, the parameter definition data includes parameter name data indicating a name of the parameter and type data indicating a type of the parameter.

FIG. 3 indicates that construction of NSes named "BigData" uses parameters including a parameter named "service_url" and a parameter named "cluster_instance_url." In the following description, with respect to NSes named "BigData" (namely, the NS 30*b* and the NS 30*c* described above), the parameter named "service_url" is referred to as "first parameter of the NSes." With respect to the NSes named "BigData" (namely, the NS 30*b* and the NS 30*c* described above), the parameter named "cluster_instance_url" is referred to as "second parameter of the NSes."

FIG. 4 indicates that construction of NSes named "BigData Mirroring" uses parameters including a parameter named "src_cluster_instance_url" and a parameter named "dest_cluster_instance_url." In the following description, with respect to NSes named "BigData Mirroring" (namely, the NS 30*d* and the NS 30*e* described above), the parameter named "src_cluster_instance_url" is referred to as "first parameter of the NSes." With respect to the NSes named "BigData Mirroring" (namely, the NS 30*d* and the NS 30*e* described above), the parameter named "dest_cluster_instance_url" is referred to as "second parameter of the NSes."

In this embodiment, a dummy bundle file, which is a bundle file that does not include pods or any other substances of an application, is registered in the NOS 12. The dummy bundle file may be registered in the NOS 12 by a vendor from one of the vendor terminals 16, or may be registered in the NOS 12 by the administrator of the NOS 12 from the administrator terminal 18.

FIG. 5 is a diagram for schematically illustrating an example of structure of a dummy bundle file that corresponds to the NS 30*f* described above. As illustrated in FIG. 5, the dummy bundle file includes an ID which is an identifier of the dummy bundle file and name data indicating a name of the dummy bundle file.

The dummy bundle file also includes parameter definition data indicating a definition of one or a plurality of parameters used to construct elements associated with the dummy bundle file. As illustrated in FIG. 5, the parameter definition data includes parameter name data indicating a name of the parameter and type data indicating a type of the parameter.

In FIG. 5, the parameter name data indicating a name "service_url" is illustrated. A parameter having this name is a parameter used in construction of the NS 30*b* and the NS 30*c*. In the following description, the parameter of the NS 30*f* named "service_url" is referred to as "first parameter of the NS 30*f*."

Unlike the bundle files illustrated in FIG. 3 and FIG. 4, the dummy bundle file illustrated in FIG. 5 includes no container image.

Figure 8:
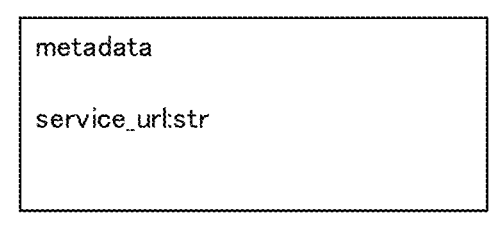

In this embodiment, the parameter definition data is not limited to any particular format. For example, the parameter definition data may be data having a text format as illustrated in FIG. 6 to FIG. 8. FIG. 6 is a diagram for illustrating an example of the parameter definition data of the bundle file illustrated in FIG. 3, with the parameter definition data expressed in a text format. FIG. 7 is a diagram for illustrating an example of the parameter definition data of the bundle file illustrated in FIG. 4, with the parameter definition data expressed in a text format. FIG. 8 is a diagram for illustrating an example of the parameter definition data of the dummy bundle file illustrated in FIG. 5, with the parameter definition data expressed in a text format.

In this embodiment, a virtual bundle file, which is a bundle file associated with a combination of NSes (a package product) purchased by a user who is a purchaser, is registered in the NOS 12. The virtual bundle file is registered in the NOS 12 by, for example, the administrator of the NOS 12 from the administrator terminal 18.

FIG. 9 is a diagram for schematically illustrating an example of structure of a virtual bundle file that corresponds to the NS 30*a* described above. As illustrated in FIG. 9, the virtual bundle file includes an ID which is an identifier of the virtual bundle file and name data indicating a name of the virtual bundle file.

The virtual bundle file also includes a bundle ID of a dummy bundle file or a bundle file of elements included in a package product that corresponds to the virtual bundle file, and quantity data indicating the number of the elements included in the package product. The virtual bundle file of FIG. 9 indicates that the NS 30*a* includes two NSes (the NS 30*b* and the NS 30*c*) corresponding to the bundle file illustrated in FIG. 3, and that the NS 30*a* includes two NSes (the NS 30*d* and the NS 30*e*) corresponding to the bundle file illustrated in FIG. 4. The virtual bundle file of FIG. 9 also indicates that the NS 30*a* includes one NS (the NS 30*f*) corresponding to the dummy bundle file illustrated in FIG. 5.

In this embodiment, the reference data indicating a reference destination parameter, which is referred to in reference between elements, and a reference source parameter, which makes the reference, is registered in the NOS 12 by, for example, the administrator of the NOS 12 from the administrator terminal 18.

FIG. 10 is a table for showing an example of the reference data. As shown in FIG. 10, the reference data includes a reference source ID, reference source parameter name data, a reference destination ID, and reference destination parameter name data.

The ID described above that is an ID included in a bundle file of an element to which the reference source parameter is set is set to the reference source ID. A value of the parameter name data of the reference source parameter is set to a value of the reference source parameter name data. The ID described above that is an ID included in a bundle file of an element to which the reference destination parameter is set is set to the reference destination ID. A value of the parameter name data of the reference destination parameter is set to a value of the reference destination parameter name data.

As described above with reference to FIG. 2, the reference data shown in FIG. 10 indicates that the first parameter of the NS 30*b* and the NS 30*c* refers to the first parameter of the NS 30*f*.

The reference data also indicates that the first parameter of the NS 30*d* and the NS 30*e* refers to the second parameter of the NS 30*b* and the NS 30*c*.

The reference data also indicates that the second parameter of the NS 30*d* and the NS 30*e* refers to the second parameter of the NS 30*b* and the NS 30*c*.

Figure 11:
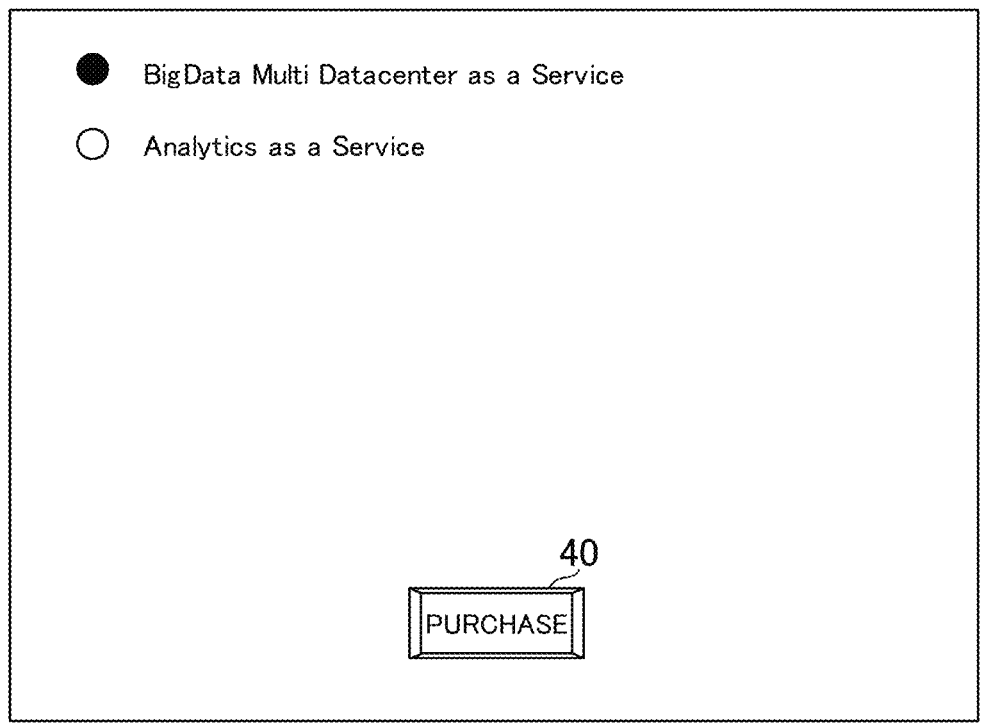
FIG. 11 is a diagram for illustrating an example of a purchase screen.

FIG. 11 is a diagram for illustrating an example of a purchase screen in this embodiment. In this embodiment, for example, the purchase screen illustrated in FIG. 11 is displayed on one of the purchaser terminals 14. The user who is the purchaser selects, for example, the NS 30*a* as illustrated in FIG. 11, and clicks on a "purchase" button 40, with the result that an input screen for inputting a value of a parameter to be set to an element included in the NS 30*a* in construction of the element is displayed on the one of the purchaser terminals 14.

In this embodiment, for example, an input screen for inputting a value of a parameter for an element without a parameter that refers to another parameter is displayed first. Here, for example, a screen illustrated in FIG. 12 which is an input screen for inputting a value of a parameter for the NS 30*f* is displayed on the one of the purchaser terminals 14.

Figure 12:
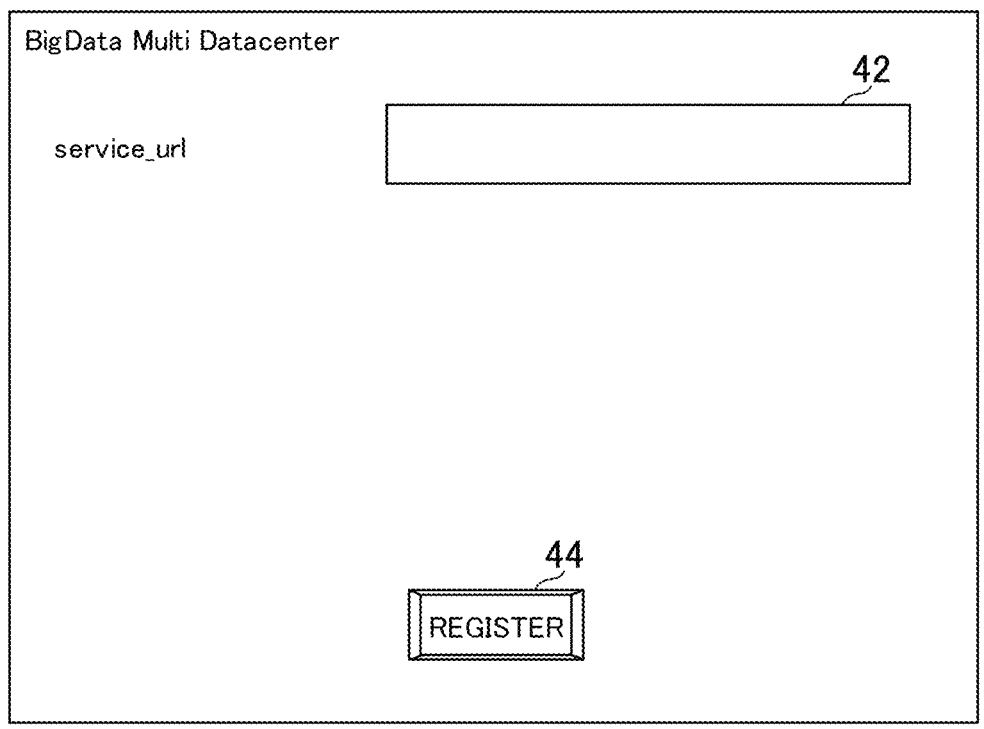
FIG. 12 is a diagram for illustrating an example of an input screen for inputting a value of a parameter.

An input form 42 for inputting a value of the first parameter of the NS 30*f* and a "register" button 44 are placed in the input screen illustrated in FIG. 12.

Figure 13:
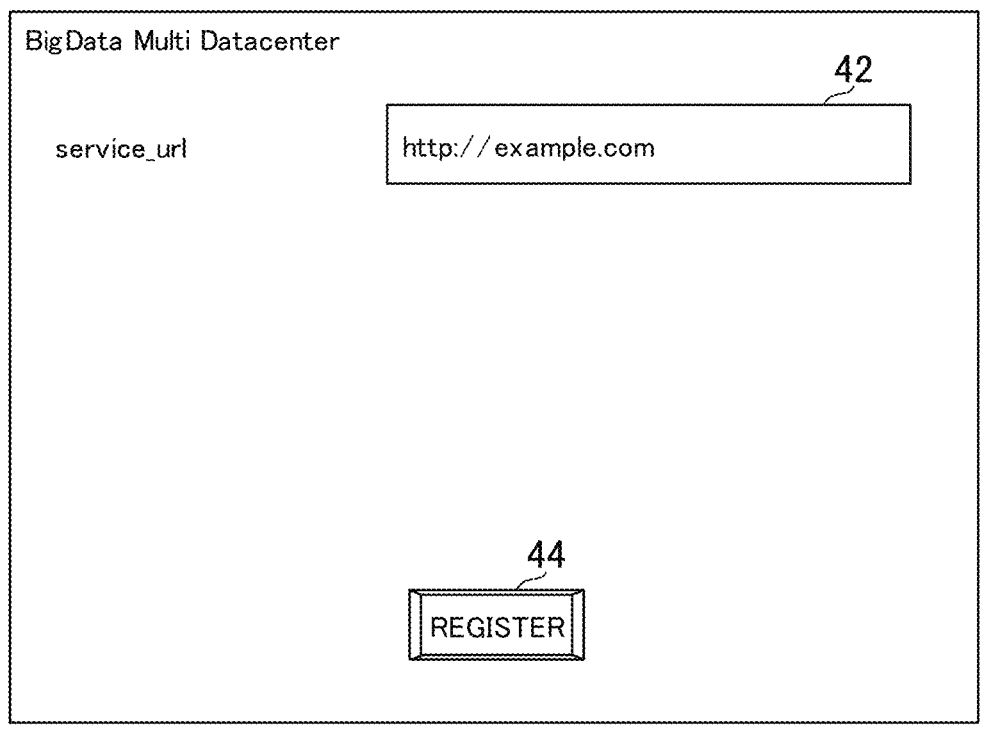
FIG. 13 is a diagram for illustrating an example of the input screen for inputting a value of a parameter.

When the user inputs a value in the input form 42 as illustrated in FIG. 13 and clicks on the "register" button 44, the input value is set as the value of the first parameter of the NS 30*f*.

In this embodiment, the same value is set also to a parameter that refers to this parameter. Here, for example, the value input in the input form 42 is set as the value of the first parameter of the NS 30*b* and the NS 30*c* as well.

Next, an input screen for inputting a value of a parameter for an element including a parameter that refers to the parameter set to the NS 30*f* is displayed on the one of the purchaser terminals 14.

Figure 14:
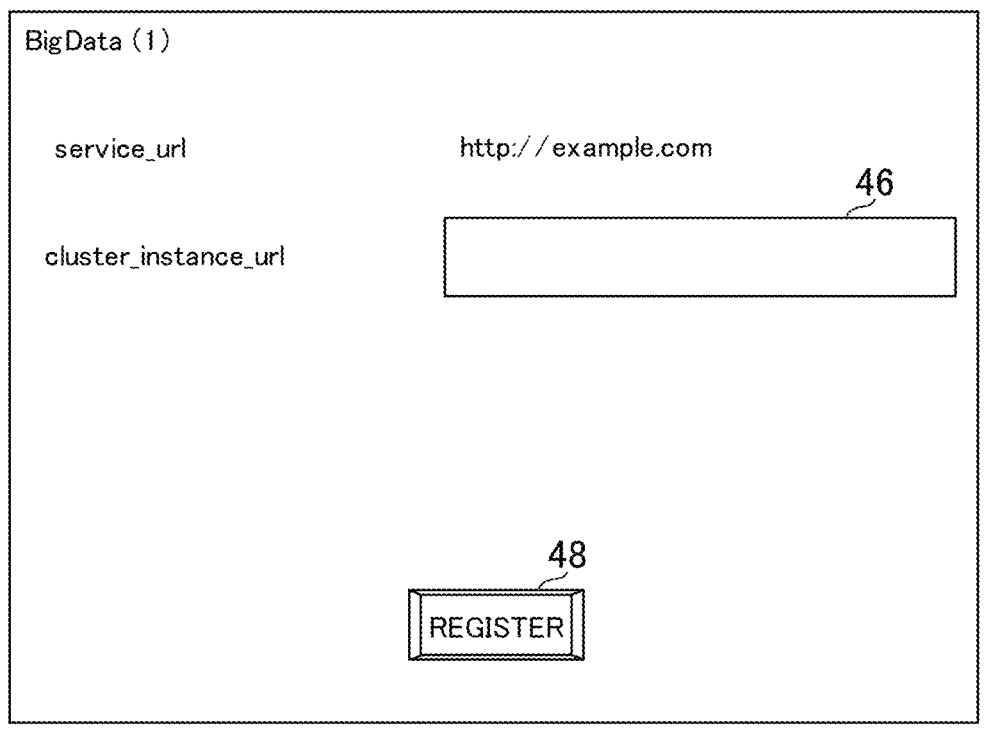
FIG. 14 is a diagram for illustrating an example of another input screen for inputting a value of a parameter.

Here, for example, an input screen for inputting a value of a parameter for the NS 30*b* as illustrated in FIG. 14 is displayed on the one of the purchaser terminals 14. As described above, the value of the first parameter is already set for the NS 30*b*. The value of the first parameter that has been set for the NS 30*b* is accordingly placed in the input screen illustrated in FIG. 14.

An input form 46 for inputting a value of the second parameter, which is a remaining parameter to be set to the NS 30*b*, and a "register" button 48 are also placed in the input screen illustrated in FIG. 14.

Figure 15:
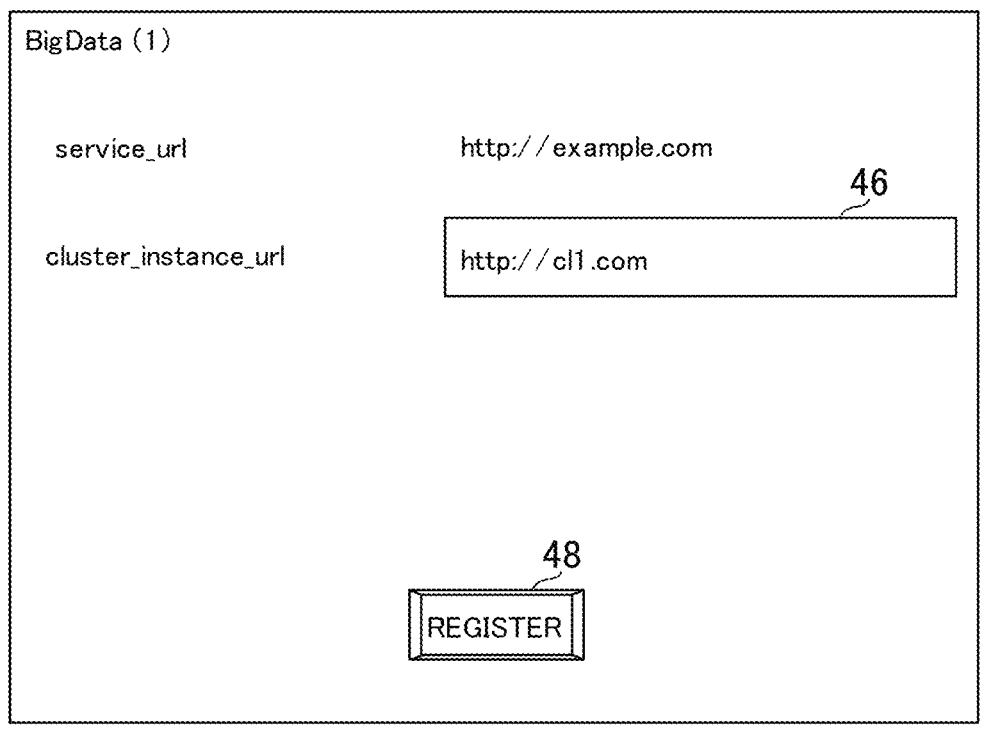
FIG. 15 is a diagram for illustrating an example of the another input screen for inputting a value of a parameter.

When the user inputs a value in the input form 46 as illustrated in FIG. 15 and clicks on the "register" button 48, the input value is set as the value of the second parameter of the NS 30*b*.

Figure 16:
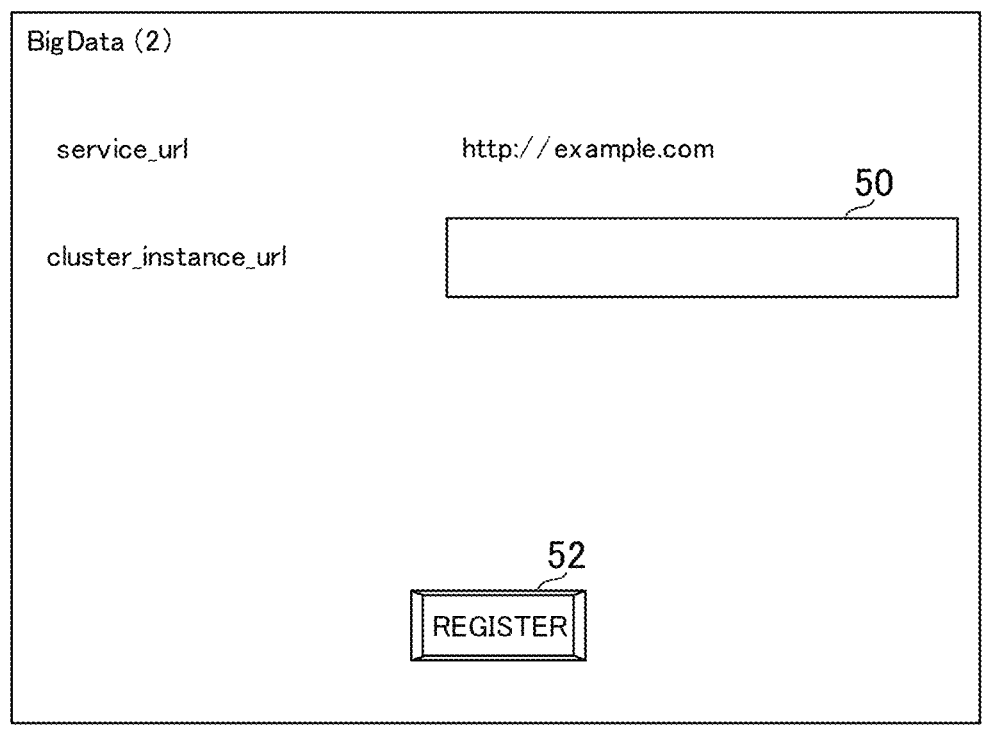
FIG. 16 is a diagram for illustrating an example of still another input screen for inputting a value of a parameter.

Then, an input screen for inputting a value of a parameter for the NS 30*c* as illustrated in FIG. 16 is displayed on the one of the purchaser terminals 14. As described above, the value of the first parameter is already set for the NS 30*c*. The value of the first parameter that has been set for the NS 30*c* is accordingly placed in the input screen illustrated in FIG. 16.

An input form 50 for inputting a value of the second parameter, which is a remaining parameter to be set to the NS 30*c*, and a "register" button 52 are also placed in the input screen illustrated in FIG. 16.

Figure 17:
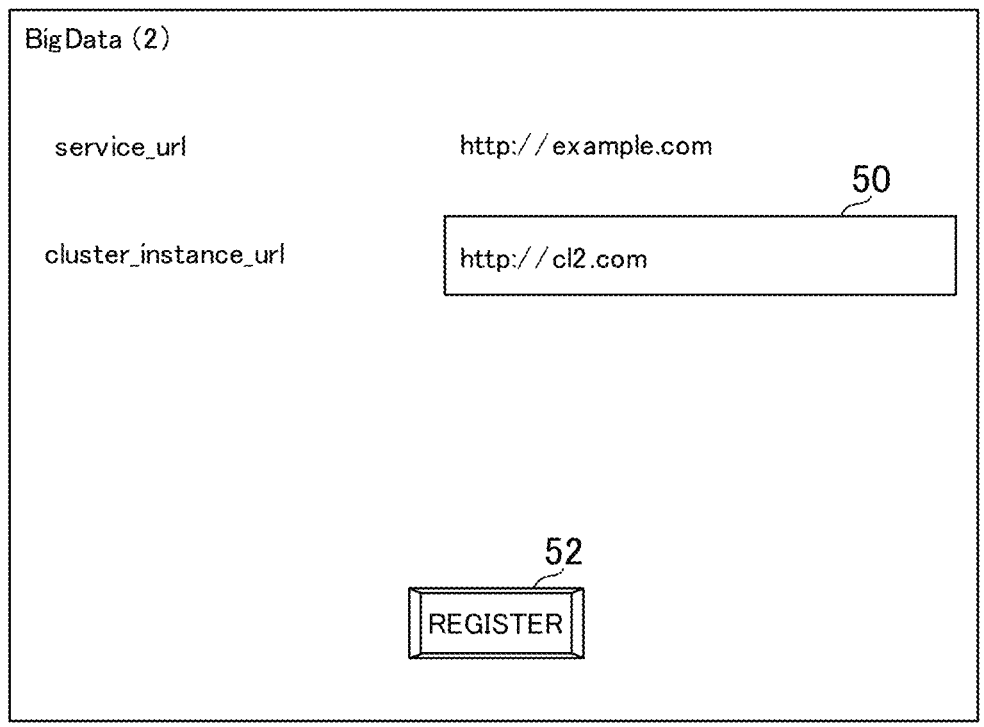
FIG. 17 is a diagram for illustrating an example of the still another input screen for inputting a value of a parameter.

When the user inputs a value in the input form 50 as illustrated in FIG. 17 and clicks on the "register" button 52, the input value is set as the value of the second parameter of the NS 30*c*.

Next, an input screen for inputting a value of a parameter for an element including a parameter that refers to the parameter set to the NS 30*b* or the NS 30*c* is displayed on the one of the purchaser terminals 14.

Figure 18:
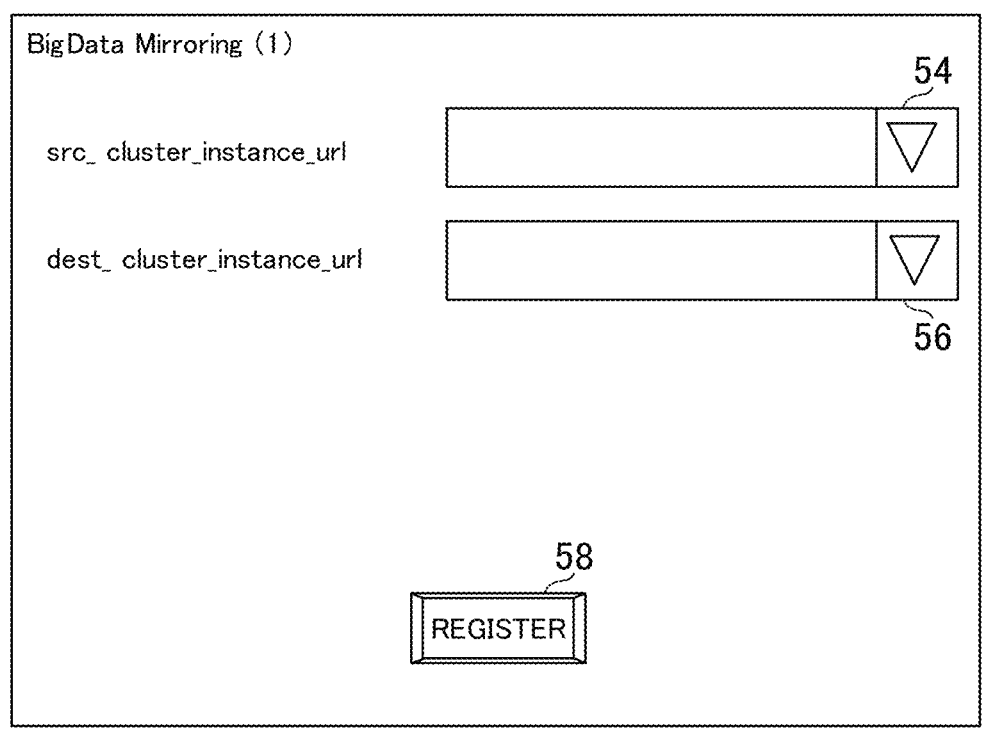
FIG. 18 is a diagram for illustrating an example of yet still another input screen for inputting a value of a parameter.

Here, for example, an input screen for inputting a value of a parameter for the NS 30*d* as illustrated in FIG. 18 is displayed on the one of the purchaser terminals 14.

As described above, the first parameter of the NS 30*d* refers to the second parameter of the NS 30*b* and the NS 30*c*.

When there are a plurality of reference destinations as in this case, a pulldown menu 54 for inputting a value of the first parameter is placed in the input screen as illustrated in FIG. 18. Similarly, a pulldown menu 56 for inputting a value of the second parameter is placed in the input screen. A "register" button 58 is placed in the input screen as well.

The value of the second parameter that has been set to the NS 30*b* and the value of the second parameter that has been set to the NS 30*c* are selectable on the pulldown menu 54. The value of the second parameter that has been set to the NS 30*b* and the value of the second parameter that has been set to the NS 30*c* are selectable on the pulldown menu 56 as well.

Figure 19:
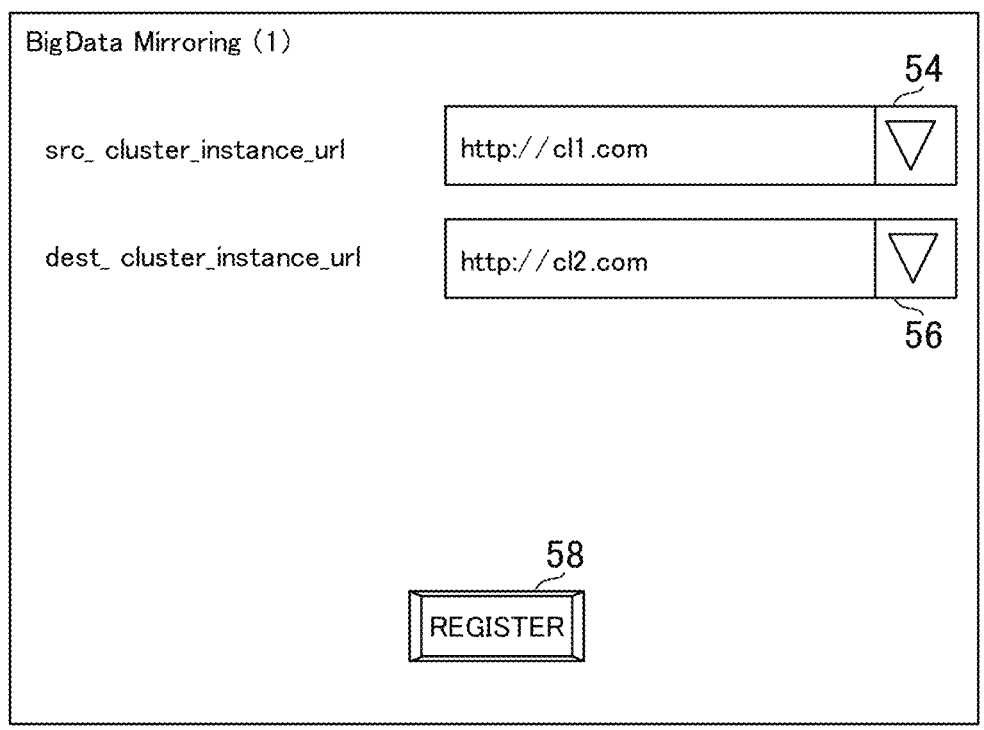
FIG. 19 is a diagram for illustrating an example of the yet still another input screen for inputting a value of a parameter.

When the user selects values on the user pulldown menu 54 and the pulldown menu 56 as illustrated in FIG. 19, and clicks on the "register" button 58, the value selected on the pulldown menu 54 is set as the value of the first parameter of the NS 30*d*. The value selected on the pulldown menu 56 is set as the value of the second parameter of the NS 30*d*.

Figure 20:
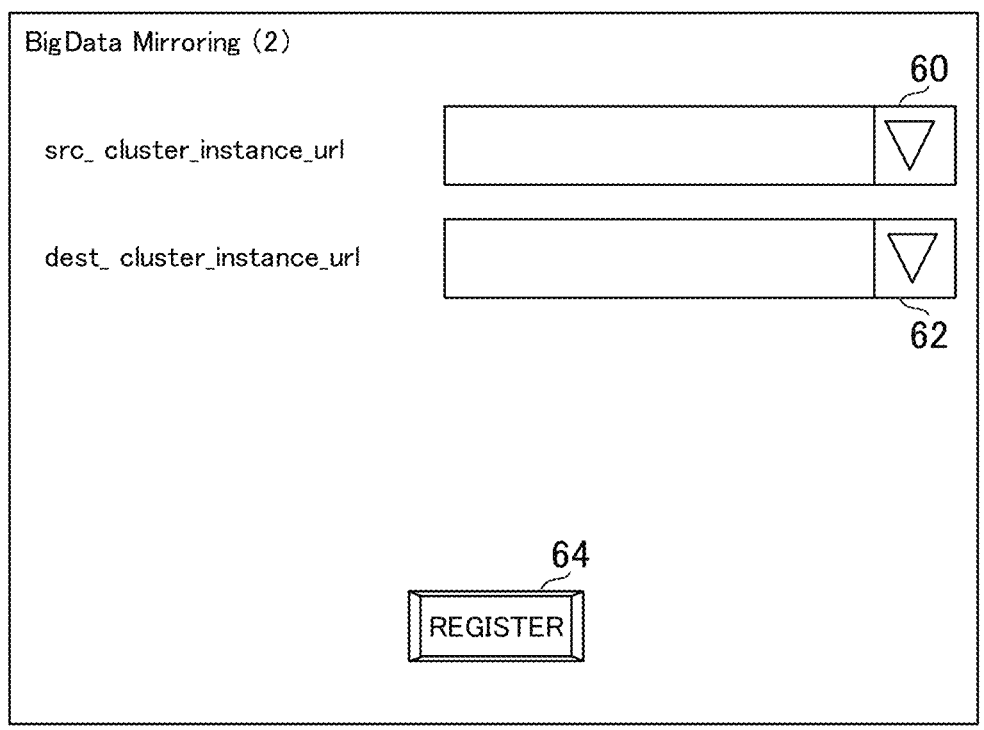
FIG. 20 is a diagram for illustrating an example of even yet still another input screen for inputting a value of a parameter.

Then, an input screen for inputting a value of a parameter for the NS 30*e* as illustrated in FIG. 20 is displayed on the one of the purchaser terminals 14.

As described above, the first parameter of the NS 30*e* refers to the second parameter of the NS 30*b* and the NS 30*c*. The second parameter of the NS 30*e* refers to the second parameter of the NS 30*b* and the NS 30*c*.

Thus, as in the input screen illustrated in FIG. 18, a pulldown menu 60 for inputting a value of the first parameter and a pulldown menu 62 for inputting a value of the second parameter are placed in the input screen illustrated in FIG. 20. A "register" button 64 is placed in the input screen as well.

The value of the second parameter that has been set to the NS 30*b* and the value of the second parameter that has been set to the NS 30*c* are selectable on the pulldown menu 60. The value of the second parameter that has been set to the NS 30*b* and the value of the second parameter that has been set to the NS 30*c* are selectable on the pulldown menu 62 as well.

Figure 21:
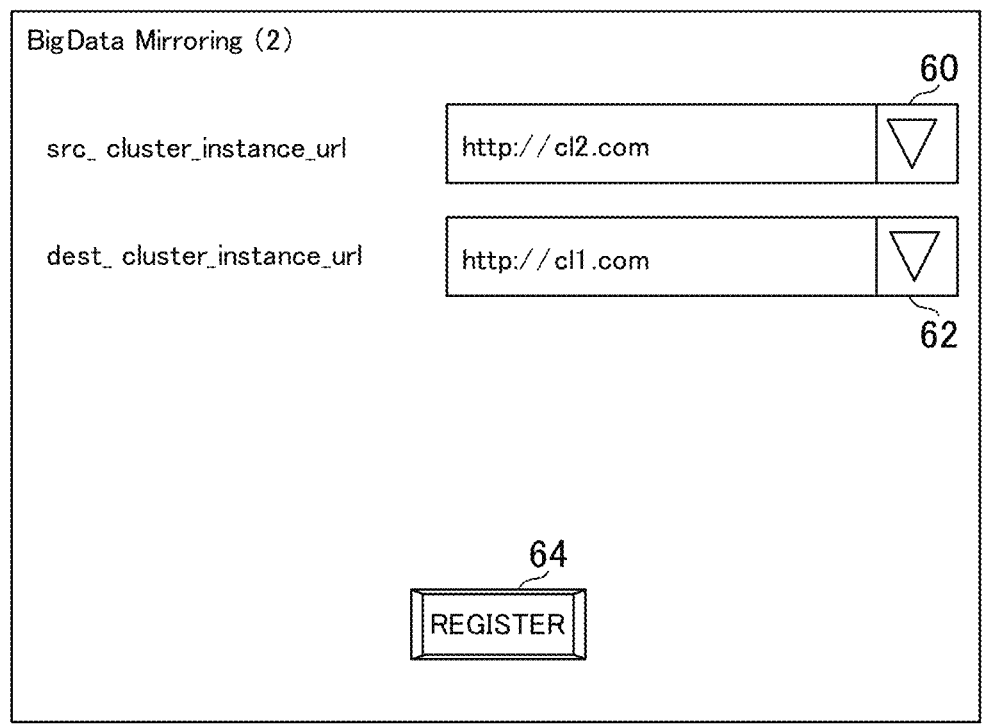
FIG. 21 is a diagram for illustrating an example of the even yet still another input screen for inputting a value of a parameter.

When the user selects values on the user pulldown menu 60 and the pulldown menu 62 as illustrated in FIG. 21, and clicks on the "register" button 64, the value selected on the pulldown menu 60 is set as the value of the first parameter of the NS 30*e*. The value selected on the pulldown menu 62 is set as the value of the second parameter of the NS 30*e*.

In this embodiment, for example, the plurality of NSes included in the NS 30*a* are constructed based on the parameter values set by the user in the manner described above.

Here, for example, the NS 30*b* is constructed based on the value of the first parameter of the NS 30*b* and the value of the second parameter of the NS 30*b*. For example, the NS 30*c* is constructed based on the value of the first parameter of the NS 30*c* and the value of the second parameter of the NS 30*c*. For example, the NS 30*d* is constructed based on the value of the first parameter of the NS 30*d* and the value of the second parameter of the NS 30*d*. For example, the NS 30*e* is constructed based on the value of the first parameter of the NS 30*e* and the value of the second parameter of the NS 30*e*.

In the related art, a setting file of a parameter is provided for each element independently. Consequently, in the case of, for example, the value of the parameter named "service_url," the user is required to input the same value separately on the input screen for inputting the value of the parameter of the NS 30*b* and the input screen for inputting the value of the parameter of the NS 30*c*.

In this embodiment, when the user inputs the value of the parameter named "service_url" once, this value is set to both of the parameter of the NS 30*b* and the parameter of the NS 30*c* in the manner described above.

In this embodiment, when a reference source parameter has a plurality of reference destination parameters, the value of the reference source parameter can be set by the user's operation in which a value is selected from parameter values set to the reference destination parameters. The user is not required to input the parameter value again in this case as well.

According to this embodiment, the user's trouble in inputting a value of a parameter related to a plurality of network services can be saved in this manner.

A further description is given below of functions of the MPS 10 and the NOS 12 in this embodiment and a process executed by the MPS 10.

Figure 22:
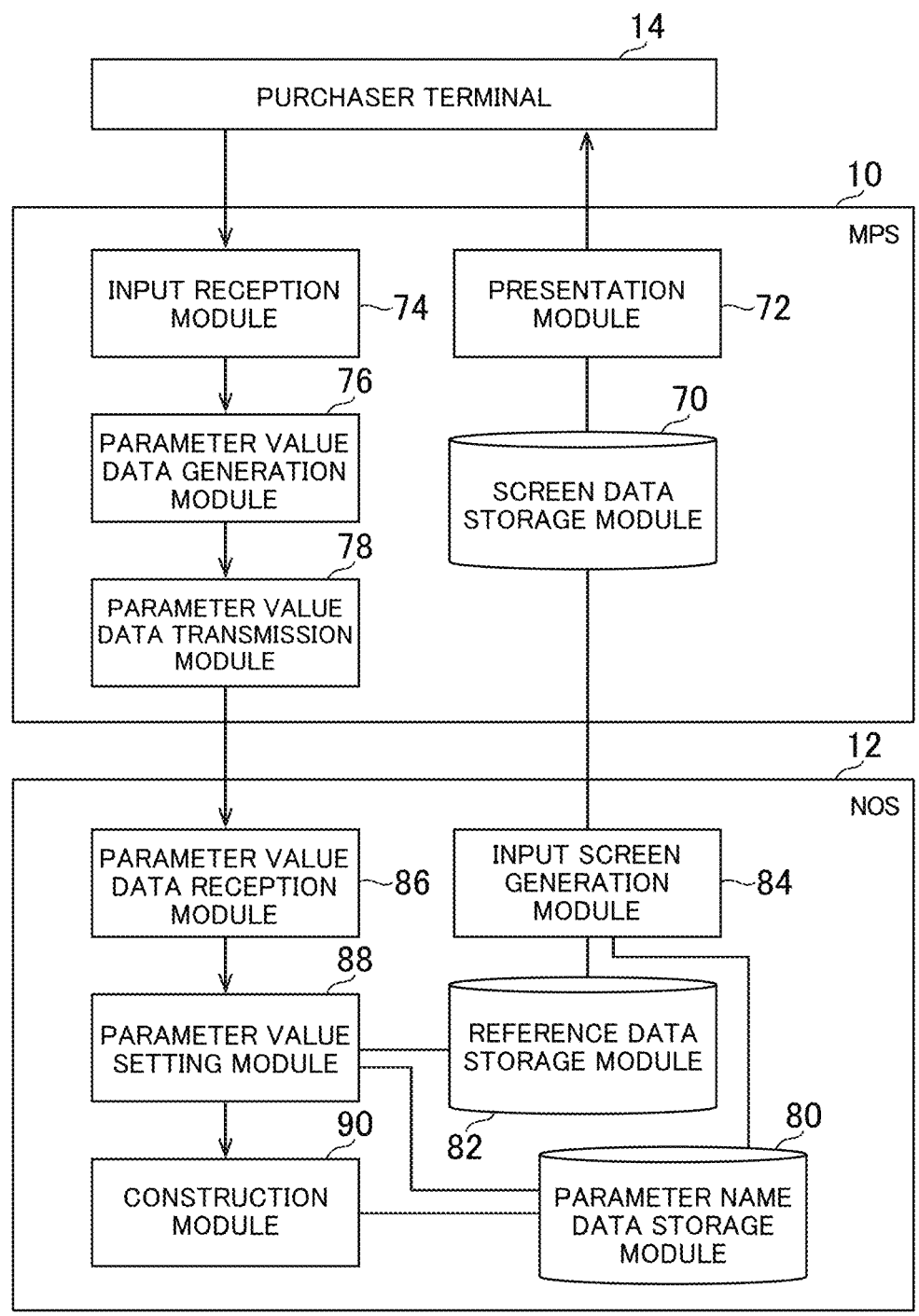
FIG. 22 is a function block diagram for illustrating an example of functions implemented by an MPS and an NOS in one embodiment of the present invention.

FIG. 22 is a function block diagram for illustrating an example of functions implemented by the MPS 10 and the NOS 12 in this embodiment. A plurality of function blocks illustrated in a block diagram of the present application can be configured from a circuit block, a memory, and other types of LSI in terms of hardware, and is implemented by, for example, a CPU by executing a program loaded onto a memory in terms of software. Accordingly, a person skilled in the art would understand that those function blocks are implementable in various forms by pieces of hardware alone, pieces of software alone, or a combination of hardware and software. In the MPS 10 and the NOS 12 in this embodiment, not all of the functions illustrated in FIG. 22 are required to be implemented, and functions other than the functions illustrated in FIG. 22 may be implemented.

As illustrated in FIG. 22, the MPS 10 in this embodiment includes, in terms of function, a screen data storage module 70, a presentation module 72, an input reception module 74, a parameter value data generation module 76, and a parameter value data transmission module 78, for example.

The screen data storage module 70 is implemented mainly by the storage unit 10*b*. The presentation module 72, the input reception module 74, and the parameter value data transmission module 78 are implemented mainly by the communication unit 10*c*. The parameter value data generation module 76 is implemented mainly by the processor 10*a*.

Those functions may be implemented by the processor 10*a* by executing a program that includes commands corresponding to those functions and that is installed in the MPS 10, which is a computer. This program may be supplied to the MPS 10 via a computer-readable information storage medium, for example, an optical disc, a magnetic disk, magnetic tape, a magneto optical disc, or a flash memory, or via the Internet or the like.

As illustrated in FIG. 22, the NOS 12 in this embodiment includes, in terms of function, a parameter name data storage module 80, a reference data storage module 82, an input screen generation module 84, a parameter value data reception module 86, a parameter value setting module 88, and a construction module 90, for example.

The parameter name data storage module 80 and the reference data storage module 82 are implemented mainly by the storage unit 12*b*. The parameter value data reception module 86 is implemented mainly by the communication unit 12*c*. The parameter value setting module 88 is implemented mainly by the processor 12*a*. The input screen generation module 84 and the construction module 90 are implemented mainly by the processor 12*a* and the communication unit 12*c*.

Those functions may be implemented by the processor 12*a* by executing a program that includes commands corresponding to those functions and that is installed in the NOS 12, which is a computer. This program may be supplied to the NOS 12 via a computer-readable information storage medium, for example, an optical disc, a magnetic disk, magnetic tape, a magneto optical disc, or a flash memory, or via the Internet or the like.

In this embodiment, for example, the parameter name data storage module 80 stores, for each of a plurality of elements included in the communication system 1, a plurality of pieces of parameter name data indicating names of parameters to be set to the element, in association with the element. The parameter name data storage module 80 stores, for example, the bundle files, the dummy bundle file, and the virtual bundle file described above. As described above, the bundle files and the dummy bundle file include parameter name data.

In this embodiment, for example, the reference data storage module 82 stores the reference data which is shown in FIG. 10 as an example and which indicates a reference destination parameter of reference between elements and a reference source parameter of the reference.

An element related to the reference destination parameter and an element related to the reference source parameter may be provided by different vendors or the same vendor. For example, the NS 30*b* and the NS 30*c* may be NSes provided by a vendor different from a vendor of the NS 30*d* and the NS 30*e*. The NS 30*f* may be an NS provided by a vendor different from a vendor of the NS 30*b* and the NS 30*c*. The NS 30*a* may be an NS provided by a vendor different from a vendor of the NS 30*b*, the NS 30*c*, the NS 30*d*, the NS 30*e*, and the NS 30*f*.

In this embodiment, for example, the input screen generation module 84 generates an input screen for inputting a value of a parameter based on the reference data and the parameter name data. The input screen generation module 84 generates, for example, screen data indicating the input screen for inputting a value of a parameter. The input screen generation module 84 then stores the generated screen data in the screen data storage module 70.

The input screen generation module 84 may generate, for example, a graph similar to the graph shown in FIG. 2, based on the reference data and the parameter name data. An element corresponding to an end point of a longest path may be identified by searching the graph. The input screen generation module 84 may set an order of presentation in which input screens for inputting values of parameters related to elements are presented, starting from the identified element. The input screen generation module 84 may generate a piece of screen data indicating the input screen for one element at a time by following the order of presentation.

In this embodiment, for example, the screen data storage module 70 stores pieces of screen data indicating the purchase screen described above and the input screen described above for inputting a value of a parameter. The screen data storage module 70 may store screen data generated by the input screen generation module 84.

In this embodiment, for example, the presentation module 72 presents a screen indicated by screen data to a user of the one of the purchaser terminals 14. The presentation module 72 transmits, for example, screen data stored in the screen data storage module 70 to the one of the purchaser terminals 14. The one of the purchaser terminals 14 displays a screen indicated by the screen data on a display or a similar display unit. The presentation module 72 may sequentially present input screens in the order of presentation set by the input screen generation module 84.

In this embodiment, for example, the input reception module 74 receives data indicating the user's input to a screen displayed on one of the purchaser terminals 14. The input reception module 74 receives the data indicating the user's input to a screen displayed on one of the purchaser terminals 14 from, for example, the one of the purchaser terminals 14. The data received by the input reception module 74 includes data indicating a value of a parameter to be set to an NS or other elements to be constructed, for example, a value input to an input form or a value selected on a pulldown menu.

In this embodiment, for example, the parameter value data generation module 76 generates parameter value data indicating a value of a parameter to be set to an NS or other elements to be constructed, based on the data received by the input reception module 74.

In this embodiment, for example, the parameter value data transmission module 78 transmits the parameter value data generated by the parameter value data generation module 76 to the NOS 12.

In this embodiment, for example, the parameter value data reception module 86 receives the parameter value data transmitted from the parameter value data transmission module 78.

In this embodiment, for example, the parameter value setting module 88 sets a value input as a value of a parameter by the user to an input screen as the value of the parameter.

In this embodiment, the presentation module 72 presents, for example, the screen illustrated in FIG. 12 as an input screen for inputting a value of a parameter to be set to the NS 30*f*, which is an element related to a reference destination parameter. Here, an input screen for inputting the value of the first parameter of the NS 30*f* is presented.

In this case, the parameter value setting module 88 sets a value input as a reference destination parameter by the user to the input screen, as the value of the reference destination parameter and also as the value of the reference source parameter.

For example, a value input to the input screen in the manner illustrated in FIG. 13 is set here as the value of the reference destination parameter, that is, the value of the first parameter of the NS 30*f*. The value input to the input screen is set also as the value of the first parameter of the NS 30*b* and the value of the first parameter of the NS 30*c*, which are the value of the reference source parameter.

In this embodiment, for example, the parameter value setting module 88 also sets a value of a remaining parameter to be set to the element related to the reference source parameter, based on the user's input related to the parameter.

For example, a value input to the input screen illustrated in FIG. 14 is set as the value of the second parameter that is a remaining parameter to be set to the NS 30*b*. A value input to the input screen illustrated in FIG. 16 is set as the value of the second parameter of the NS 30*c*.

When a reference source parameter has a plurality of reference destination parameters, the parameter value setting module 88 may set, as a value of the reference source parameter, a value selected by the user from values set to the plurality of reference destination parameters.

For example, the first parameter of the NS 30*d* has the second parameter of the NS 30*b* and the second parameter of the NS 30*c* as reference destination parameters. In this case, the user may set, as the value of the first parameter of the NS 30*d*, a value selected by the user from the value of the second parameter of the NS 30*b* and the value of the second parameter of the NS 30*c*. Similarly, the second parameter of the NS 30*d* has the second parameter of the NS 30*b* and the second parameter of the NS 30*c* as reference destination parameters. In this case, the user may set, as the value of the second parameter of the NS 30*d*, a value selected by the user from the value of the second parameter of the NS 30*b* and the value of the second parameter of the NS 30*c*. In the same manner, a value selected by the user from values set to a plurality of reference destination parameters of a parameter of the NS 30*e* is set as the value of the parameter of the NS 30*e*.

In this embodiment, for example, the construction module 90 constructs a plurality of elements including an element that is related to a reference destination parameter indicated by the reference data and an element that is related to a reference source parameter indicated by the reference data. Here, the NS 30*b*, the NS 30*c*, the NS 30*d*, and the NS 30*e* are constructed based on parameter values set by the parameter value setting module 88.

The construction module 90 may include, for example, Kubernetes or other container management tools. The construction module 90 may deploy pods to which parameter values are set in the manner described above in a cluster provided in the RANs 20 or the core network systems 22.

In this embodiment, for example, a click on the "purchase" button 40 on the purchase screen illustrated in FIG. 11 causes a signal indicating a purchase of the NS 30*a* to be sent from the one of the purchaser terminals 14 to the MPS 10 and the NOS 12.

Figure 23:
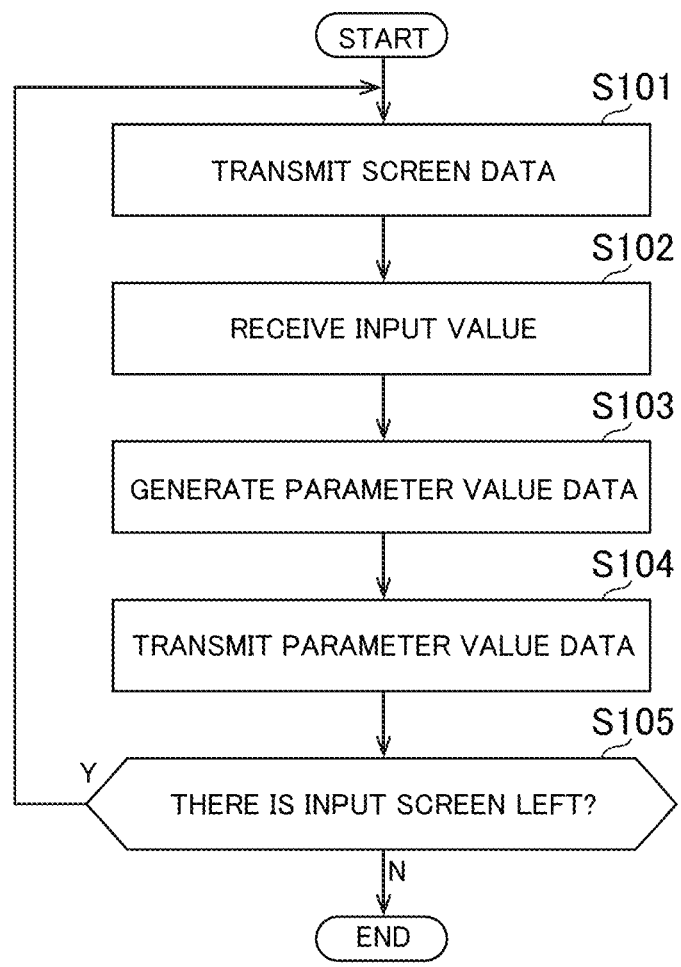
FIG. 23 is a flow chart for illustrating an example of a flow of a process executed by the MPS.

An example of a flow of a process executed by the MPS 10 with reception of the signal indicating a purchase of the NS 30*a* as a trigger is described with reference to a flow chart of FIG. 23.

First, the presentation module 72 transmits screen data indicating the first input screen to the one of the purchaser terminals 14 (Step S101). The input screen is displayed on the one of the purchaser terminals 14.

The input reception module 74 receives, from the one of the purchaser terminals 14, a value input by the user to the input screen that is indicated by the screen data transmitted in the process step of Step S101 (Step S102). In the process step of Step S102, a value input in an input form or a value selected on a pulldown menu, for example, is transmitted from the one of the purchaser terminals 14 to the MPS 10. This value is associated with, for example, an ID of an element to which a value of a parameter is set and a name of the parameter.

The parameter value data generation module 76 generates parameter value data based on the value received in the process step of Step S102 (Step S103). This parameter value data includes, for example, the ID of the element to which the value of the parameter is set, name data indicating the name of the parameter, and value data indicating the value received in the process step of Step S102.

The parameter value data transmission module 78 transmits the parameter value data generated in the process step of Step S103 to the NOS 12 (Step S104).

The presentation module 72 then examines whether any input screen related to the NS 30*a* is left (Step S105).

When there is a remaining input screen (Step S105: Y), the process returns to Step S101, and the presentation module 72 transmits screen data indicating an input screen that is the next in the order to the one of the purchaser terminals 14.

From then on, the process steps of from Step S101 to Step S105 are repeated until no input screen is left.

When there is no input screen left (Step S105: N), the process illustrated in this process example is ended.

Figure 24:
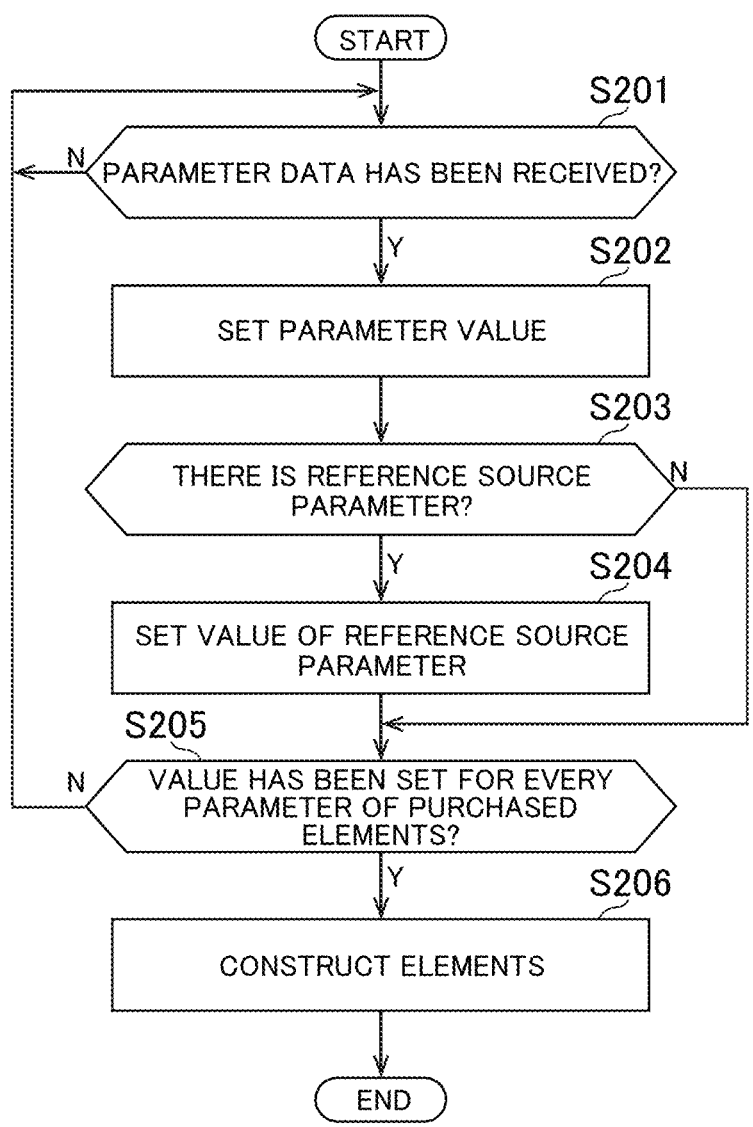
FIG. 24 is a flow chart for illustrating an example of a flow of a process executed by the NOS.

Next, an example of a flow of a process executed by the NOS 12 with reception of the signal indicating a purchase of the NS 30*a* as a trigger is described with reference to a flow chart of FIG. 24.

In this embodiment, for example, the parameter value data reception module 86 waits for reception of the parameter value data, with reception of the signal indicating a purchase of the NS 30*a* as a trigger (Step S201).

When the parameter value data is received, the parameter value setting module 88 sets a value of a parameter based on the received parameter value data (Step S202). For example, a value indicated by the value data included in the received parameter value data is set here to a parameter that has a name indicated by the name data included in the received parameter value data, for an element that is associated with the ID included in the received parameter value data.

The parameter value setting module 88 then examines, based on the reference data, whether there is a parameter that is a reference source of the parameter to which the value has been set in the process step of Step S202 (Step S203).

When the presence of a parameter that is the reference source is confirmed (Step S203: Y), the same value as the value set in the process step of Step S202 is set as a value of the reference source parameter (Step S204).

When absence of a parameter that is the reference source is confirmed in the process step of Step S203 (Step S203: N), or when the process step of Step S204 is finished, the construction module 90 examines whether a value has been set for every parameter of the elements included in the purchased NS 30*a* (Step S205). For example, whether a value has been set for every parameter of the NS 30*b*, the NS 30*c*, the NS 30*d*, and the NS 30*e* is examined here.

When not all of the parameters have a value set thereto (Step S205: N), the process returns to Step S201.

When it is confirmed that a value has been set to every parameter (Step S205: Y), the construction module 90 constructs the purchased elements (Step S206), and the process illustrated in this process example is ended. For example, the NS 30*b*, the NS 30*c*, the NS 30*d*, and the NS 30*e* are constructed here, based on the parameter values set in the process step of Step S202 or Step S204.

It should be noted that the present invention is not limited to the above-mentioned embodiment.

For example, an input screen may be generated by the administrator of the NOS 12 by referring to the parameter name data. Screen data indicating the generated input screen may be stored in the screen data storage module 70.

To give another example, the parameter value setting module 88 may generate the reference data based on the parameter name data. For example, the administrator of the NOS 12 may specify a reference source element and a reference destination element here. The parameter value setting module 88 may then examine, for each parameter set to the reference source element, whether any parameter of the reference destination element has a partially or wholly matching name. When it is confirmed that there is a parameter having a partially or wholly matching name, the parameter value setting module 88 may generate a piece of reference data indicating the parameter that is the reference source and the parameter that is the reference destination. The parameter value setting module 88 may store the generated piece of reference data in the reference data storage module 82.

How roles are divided between the MPS 10 and the NOS 12 is not limited to the allotment described above. For example, some or all of the functions implemented by the MPS 10 in FIG. 22 may be implemented by the NOS 12. Some or all of the functions implemented by the NOS 12 in FIG. 22 may be implemented by the MPS 10.

Further, the specific numerical values and character strings described above and the specific numerical values and character strings in the drawings are merely exemplary, and the present invention is not limited to those numerical values and character strings.

The invention claimed is:

1. A parameter value setting system, comprising:
   at least one processor; and
   at least one memory device storing instructions which, when executed by the at least one processor, cause the at least one processor to perform operations comprising:
   storing, for each of a plurality of elements included in a communication system, a plurality of pieces of parameter name data, wherein each of the plurality of pieces of parameter name data indicates a name of a corresponding parameter to be set for the each of the plurality of elements;
   storing reference data, wherein the reference data includes:
      a reference destination parameter, wherein the reference destination parameter indicates a parameter value of a parameter of a first element of the plurality of elements; and
      a reference source parameter, wherein the reference source parameter indicates a parameter value of a parameter of a second element of the plurality of elements, and the second element manages the first element and relies on the first element for implementing a functionality of the second element;
   presenting, to a user, for the first element, an input screen for inputting a value of the parameter to be set as the reference destination parameter; and
   automatically setting the value input by the user to the input screen, as the value of the reference source parameter,
   wherein, in response to the reference source parameter of the second element being linked to the reference destination parameter of the first element and to a reference destination parameter of a third element of the plurality of elements, setting the value of the reference source parameter equal to a value selected by the user from the reference destination parameter of the first element or the reference destination parameter of the third element.

2. The parameter value setting system according to claim 1, wherein the operations further comprise generating the input screen based on the plurality of pieces of parameter name data and the reference data.

3. The parameter value setting system according to claim 1, wherein the first element and the second element are provided by different vendors.

4. The parameter value setting system according to claim 1, wherein the operations further comprise constructing the first element and the second element.

5. The parameter value setting system according to claim 1, wherein the operations further comprise setting a value of a remaining parameter of the second element to be equal to an input of the user which is related to the remaining parameter.

6. A control method of a parameter value setting system, comprising:
   storing, for each of a plurality of elements included in a communication system, a plurality of pieces of parameter name data, wherein each of the plurality of pieces of parameter name data indicates a name of a corresponding parameter to be set for the each of the plurality of elements;
   storing reference data, wherein the reference data includes:
      a reference destination parameter, wherein the reference destination parameter indicates a parameter value of a parameter of a first element of the plurality of elements; and a reference source parameter, wherein the reference source parameter indicates a parameter value of a parameter of a second element of the plurality of elements, and the second element manages the first element and relies on the first element for implementing a functionality of the second element;

presenting, to a user, for the first element, an input screen for inputting a value of the parameter to be set as the reference destination parameter; and automatically setting the value input by the user to the input screen, as the value of the reference source parameter, wherein, in response to the reference source parameter of the second element being linked to the reference destination parameter of the first element and to a reference destination parameter of a third element of the plurality of elements, setting the value of the reference source parameter equal to a value selected by the user from the reference destination parameter of the first element or the reference destination parameter of the third element.

7. A non-transitory computer readable information storage medium storing a program for causing a computer to execute:

storing, for each of a plurality of elements included in a communication system, a plurality of pieces of parameter name data, wherein each of the plurality of pieces of parameter name data indicates a name of a corresponding parameter to be set for the each of the plurality of elements;

storing reference data, wherein the reference data includes:

a reference destination parameter, wherein the reference destination parameter indicates a parameter value of a parameter of a first element of the plurality of elements; and a reference source parameter, wherein the reference source parameter indicates a parameter value of a parameter of a second element of the plurality of elements, and the second element manages the first element and relies on the first element for implementing a functionality of the second element;

presenting, to a user, for the first element, an input screen for inputting a value of the parameter to be set as the reference destination parameter; and automatically setting the value input by the user to the input screen, as the value of the reference source parameter, wherein, in response to the reference source parameter of the second element being linked to the reference destination parameter of the first element and to a reference destination parameter of a third element of the plurality of elements, setting the value of the reference source parameter equal to a value selected by the user from the reference destination parameter of the first element or the reference destination parameter of the third element.

\* \* \* \* \*